UNITED STATES PATENT OFFICE.

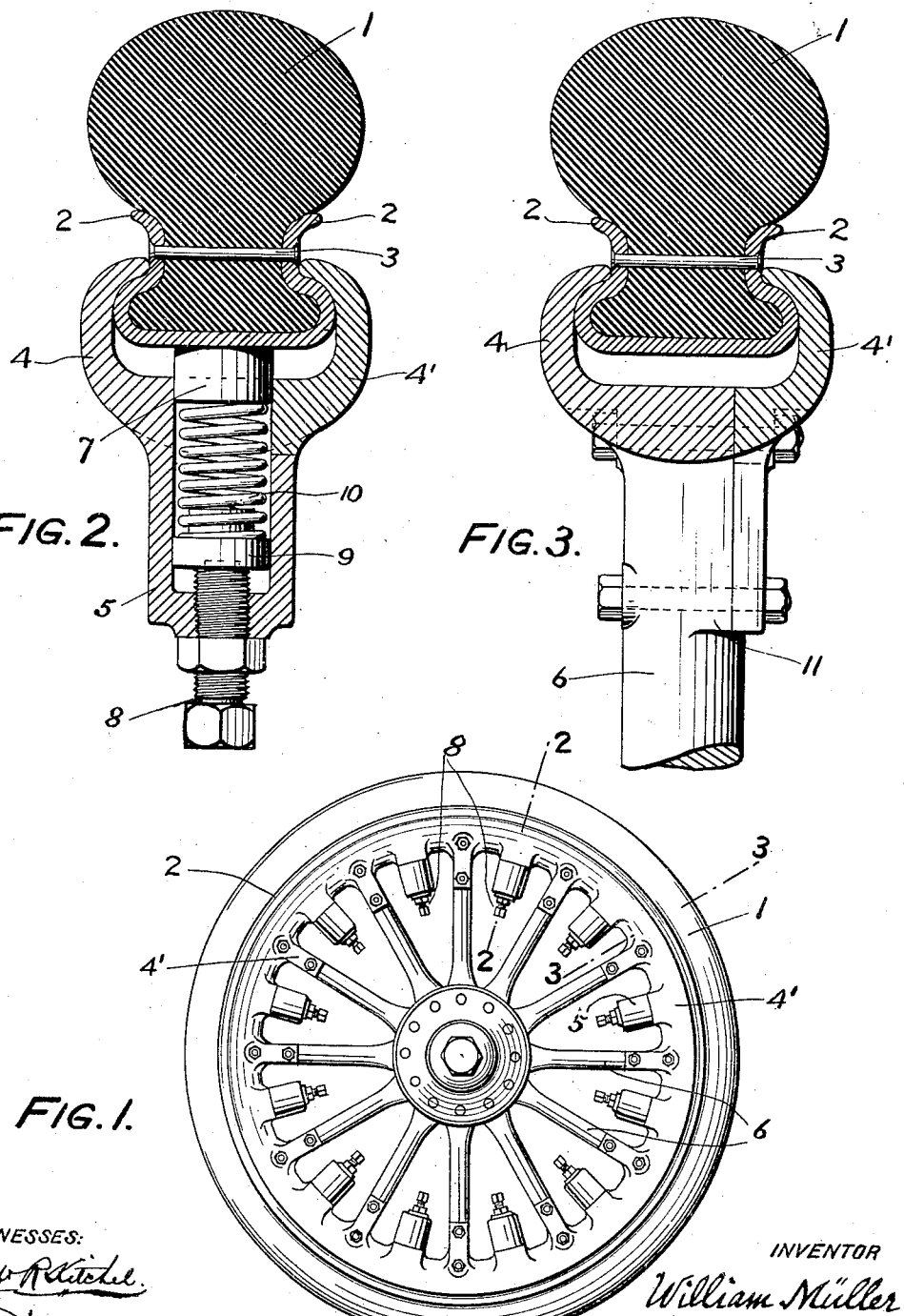

WILLIAM MÜLLER, OF PHILADELPHIA, PENNSYLVANIA.

AUTOMOBILE-TIRE.

No. 898,497.  Specification of Letters Patent.  Patented Sept. 15, 1908.

Application filed September 27, 1907. Serial No. 394,782.

*To all whom it may concern:*

Be it known that I, WILLIAM MÜLLER, a citizen of the United States, residing at No. 612 North Fifty-sixth street, in the city and county of Philadelphia and State of Pennsylvania, have invented a new and useful Automobile-Tire, of which the following is a specification.

My invention relates to automobile tires and my object is to provide a tire which shall combine the resilient qualities of the pneumatic tire with the durability of the solid rubber or cushion tire. This I accomplish by the means herein described and shown in the accompanying drawings, in which—

Figure 1 is a side view of an automobile wheel equipped with my improved tire. Fig. 2 is an enlarged view in cross section on a line 2—2, showing the tire and the manner in which it is mounted in the rim of the wheel, and Fig. 3 is an enlarged view in cross section on a line 3—3, showing the tire, and the rim at the junction of a spoke therewith, showing the manner in which the rim is split to admit of the insertion of the tire.

In Fig. 2, the tire 1, which may be of rubber or any suitable composition, is formed with a relatively circular or elliptical body, a neck and a widening base. The neck and base are provided with a metallic sheath or lining 2, the tire being secured therein both by the enlargement of the base within the sheath and by the pins or bolts 3 which pass through both tire and sheath at suitable intervals.

The split rim 4, 4' is formed with jaws, as shown in Figs. 2 and 3, which clasp the neck and base of the tire sheath in such wise as to admit a vertical play of the latter therein, as hereinafter described. The wheel rim is provided with the spring chambers 5, Figs. 1 and 2, integral with the rim, and alternating with the spokes 6, as shown in Fig. 1. The tire sheath 2 is furnished with the plungers 7, secured to the base thereof and seated in one end of the recesses of the spring chambers 5. The heads of the spring chambers are furnished with the threaded tension bolts 8 the ends of which within the spring chambers are provided with the heads 9. Between the plungers 7 and the heads 9 are coiled the springs 10.

Referring now to Fig. 2 it will be seen that the tire 1, when not under pressure, is maintained by the expansive action of the spring in the position there shown. If pressure be now applied to the tread of the tire an inward movement toward the wheel hub takes place at that point; the neck of the tire sheath 2 sliding between the jaws of the rim, the base of the tire sheath moving downward toward the base of the wheel rim and the plunger 7 descending into the spring chamber. This play of the tire within the jaws of the wheel rim may be controlled in its extent by the degree of compression to which the spring 10 is subjected by the adjustment of the tension bolt 8. The tire is secured against any tendency to slide around within the jaws of the rim by the seating of the plunger 7 in the base of the wheel rim, and the tire is also held firmly against any tendency to lateral displacement not only by the seating of the plunger, but also by the manner in which the tire is mounted in the jaws of the rim. For it will be observed that I have there two points of sliding contact and of support, viz. between the neck of the tire sheath and the edges of the jaws of the rim, and between the outer sides of the enlarged base of the tire sheath and the inner faces of said jaws. Thus the tire, being secured within its sheath by the pins or bolts 3, is proof against any danger of detachment from the wheel rim, whether by lateral strains or by the strain incident to the sudden starting or stopping of the automobile.

To admit of insertion of the tire, tire sheath and plungers in their place in the jaws and base of the wheel rim the rim is split, as shown in Figs. 2 and 3 in cross section and in Fig. 1 in side view. The removal section of the rim thus formed includes of course one jaw of the wheel rim, fitting to the side of the spring chamber as shown in Fig. 2 and with an extension bolted to each spoke as shown in Figs. 1 and 3. The ends of the spokes may be formed with an offset, as shown at 11, Fig. 3, in order both to reinforce the spoke at that point and to afford a face to which the removable section of the rim may be securely bolted.

What I claim as my invention and desire to secure by Letters Patent is—

In an automobile wheel, a split rim formed with opposing and inwardly curved jaws, one jaw being integral with the wheel spoke and the other jaw being removably secured to said wheel spoke, a spring chamber recessed in said split rim and formed partly in the integral and partly in the removable jaw thereof, a tire having an enlarged tread and base and a narrowed neck, a tire sheath secured to and inclosing the neck and base of said tire, a plunger secured to said tire sheath and slidably mounted in said spring chamber, a spring coiled in said spring chamber, and a tension bolt mounted in the end of said spring chamber, whereby the tension of said spring may be regulated, substantially as described.

WILLIAM MÜLLER.

Witnesses:
W. B. SCHERMERHORN,
LEROY N. KINA.